(12) United States Patent
Yuan et al.

(10) Patent No.: US 12,242,142 B2
(45) Date of Patent: Mar. 4, 2025

(54) OPTICAL DEVICE FOR PHASE SHIFTING AN OPTICAL SIGNAL

(71) Applicant: Hewlett Packard Enterprise Development LP, Houston, TX (US)

(72) Inventors: Yuan Yuan, Milpitas, CA (US); Wayne Victor Sorin, Milpitas, CA (US); Stanley Cheung, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 208 days.

(21) Appl. No.: 17/661,249

(22) Filed: Apr. 28, 2022

(65) Prior Publication Data
US 2023/0350238 A1  Nov. 2, 2023

(51) Int. Cl.
| | | |
|---|---|---|
| *G02F 1/015* | (2006.01) | |
| *G02F 1/025* | (2006.01) | |
| *G02F 1/225* | (2006.01) | |
| *G02F 1/21* | (2006.01) | |
| *H04B 10/2507* | (2013.01) | |

(52) U.S. Cl.
CPC ............ *G02F 1/025* (2013.01); *G02F 1/0151* (2021.01); *G02F 1/0152* (2021.01); *G02F 1/2257* (2013.01); *G02F 1/212* (2021.01); *G02F 2202/06* (2013.01); *G02F 2202/101* (2013.01); *G02F 2202/105* (2013.01); *G02F 2203/50* (2013.01); *H04B 10/2507* (2013.01)

(58) Field of Classification Search
CPC ...... G02F 1/0151; G02F 1/0152; G02F 1/025; G02F 1/212; G02F 1/2257; G02F 2002/06; G02F 2002/101; G02F 2002/105; G02F 2203/50; H04B 10/2507
See application file for complete search history.

(56) References Cited

U.S. PATENT DOCUMENTS

| | | | |
|---|---|---|---|
| 8,014,636 B2 | 9/2011 | Shubin et al. | |
| 8,937,981 B2 * | 1/2015 | Liang | H01S 5/06213 |
| | | | 372/29.013 |

(Continued)

OTHER PUBLICATIONS

Hiraki et al., "32-Gbit/s Heterogeneously Integrated Mach-Zehnder Modulator with 250μm-long III-V/Si MOS-capacitor Phase Shifter", IEEE, 2017, 3 pages.

(Continued)

*Primary Examiner* — Ryan A Lepisto
(74) *Attorney, Agent, or Firm* — Hewlett Packard Enterprise Patent Department

(57) ABSTRACT

Examples described herein relate to an optical device that entails phase shifting an optical signal. The optical device includes an optical waveguide having a first semiconductor material region and a second semiconductor material region formed adjacent to each other and defining a junction therebetween. Further, the optical device includes an insulating layer formed on top of the optical waveguide. Moreover, the optical device includes a III-V semiconductor layer formed on top of the insulating layer causing an optical mode of an optical signal passing through the optical waveguide to overlap with the first semiconductor material region, the second semiconductor material region, the insulating layer, and the III-V semiconductor layer thereby resulting in a phase shift in the optical signal passing through the optical waveguide.

20 Claims, 6 Drawing Sheets

(56) References Cited

U.S. PATENT DOCUMENTS

| | | | |
|---|---|---|---|
| 9,541,775 B2 * | 1/2017 | Ayazi | G02F 1/2257 |
| 10,241,354 B1 * | 3/2019 | Gill | G02F 1/01708 |
| 10,381,801 B1 * | 8/2019 | Liang | H01S 5/18377 |
| 10,642,077 B1 | 5/2020 | Andy et al. | |
| 2015/0280832 A1 * | 10/2015 | Fujikata | G02F 1/2257 |
| | | | 398/25 |
| 2017/0176780 A1 * | 6/2017 | Levy | G02B 6/29338 |
| 2017/0184883 A1 * | 6/2017 | Sun | G02F 1/025 |
| 2021/0336414 A1 | 10/2021 | Harris | |

OTHER PUBLICATIONS

Takenaka et al., "III-V/Si Hybrid MOS Optical Phase Shifter for Si Photonic Integrated Circuits", Journal of Lightwave Technology, vol. 37, No. 5, Mar. 1, 2019, 10 pages.

Chrostowski et al., "Silicon Photonics Design", Silicon Photonics Design, 2015, 19 pages.

Kim et al., "Heterogeneously-Integrated Optical Phase Shifters for Next-Generation Modulators and Switches on a Silicon Photonics Platform: A Review", 2021, 19 pages.

Liang et al., "Recent Progress in Heterogeneous III-V-on-Silicon Photonic Integration", Official journal of the JHL 2689-9620, 2021, 25 pages.

Srinivasan et al., "High Temperature Performance of Heterogeneous MOSCAP Microring Modulators", 2021, 3 pages.

Sun et al., "A 128 Gb/s PAM4 Silicon Microring Modulator With Integrated Thermo-Optic Resonance Tuning", Journal of Lightwave Technology, vol. 37, No. 1, Jan. 1, 2019, 6 pages.

Yong et al., "U-shaped PN junctions for efficient silicon Mach-Zehnder and microring modulators in the O-band", vol. 25, No. 7 | Apr. 3, 2017 | Optics Express 8425, 15 pages.

Yuan et al., "A 100 Gb/s PAM4 Two-Segment Silicon Microring Resonator Modulator", IEEE, 2021, 2 pages.

* cited by examiner

OPTICAL DEVICE FOR PHASE SHIFTING AN OPTICAL SIGNAL

STATEMENT OF GOVERNMENT RIGHTS

This invention was made with Government support under Award No. DE-AR0001039 awarded by DOE, Office of ARPA-E. The Government has certain rights in this invention.

BACKGROUND

Phase shifters are generally used in photonic integrated circuits to control a phase of an optical signal. For example, the phase shifters are widely used in many optical devices, such as optical modulators and optical Mach Zehnder interferometers (MZIs). Due to the lack of other significant electro-optic effects on silicon, optical phase shifters based on silicon photonics are generally designed to induce a phase shift in an optical signal using a plasma dispersion effect. Common types of optical phase shifters used in photonic integrated circuits are a PN junction, a PIN junction, and a metal-oxide-semiconductor capacitor (MOSCAP).

In the above-mentioned phase shifters, the densities of free carriers (e.g., free electrons and holes) may be controlled due to a plasma dispersion effect on the application of electrical voltage to the respective phase shifters. For example, to achieve phase shift in the optical signal, the PN junction may be operated in a carrier depletion mode, whereas the PIN junction may be operated in a carrier injection mode. A MOSCAP structure generally includes two semiconductor layers and one thin insulator layer sandwiched between them. Therefore, when an electric field is applied across the semiconductor layers, free carriers accumulate on both sides of the insulator layer. The change in the free carrier densities in a given region alters the refractive index of the given region. A change in the refractive index causes a phase shift in the optical signal passing through the given region. However, this plasma dispersion effect in silicon is relatively weak in causing the desired variations in the refractive index, resulting in less efficient optical phase shifting.

BRIEF DESCRIPTION OF THE DRAWINGS

Various examples will be described below with references to the following figures.

Figure 1:
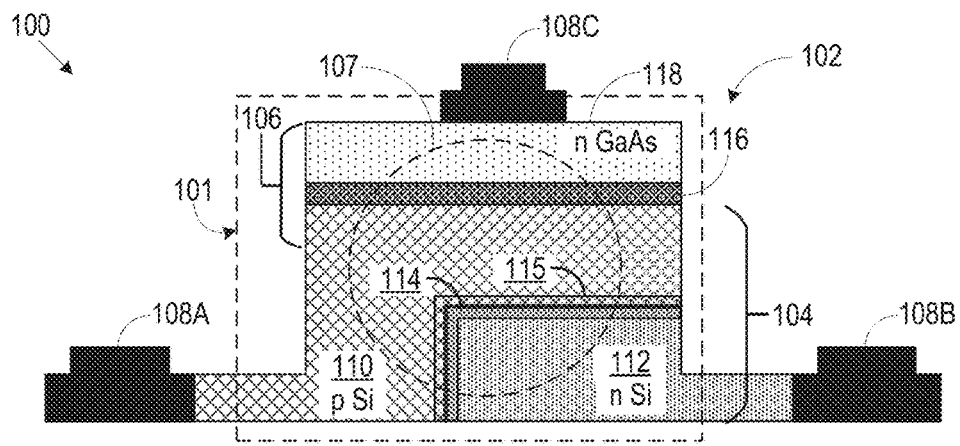
FIG. 1 depicts a cross-sectional view of an example optical device.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, the same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Optical systems include optical devices that can generate, process, and/or carry optical signals from one point to another point. In certain implementations, optical systems such as optical communication systems may facilitate data communication over longer distances with higher bandwidth using smaller cable width (or diameter) in comparison to communication systems using electrical wires. In an optical communication system, an optical signal (i.e., light) may be generated by a light source such as a laser. The optical signal may then be modulated using an information signal using an optical modulator and such modulated optical signal may be transmitted to an optoelectronic receiver through an optical fiber. The optoelectronic receiver may demodulate the received signal to extract the information signal carried by the optical signal.

Optical components, for example, an optical modulator may use a phase shifter to phase shift an optical signal and to achieve a desired modulation. In the phase shifters implemented via silicon photonics, a well-known plasma dispersion effect is commonly used to adjust the optical signal phase due to the lack of other significant electro-optic effects on silicon. The most common types of optical phase shifters that use the plasma dispersion effect are a carrier depletion mode PN junction, a carrier injection mode PIN junction, and a carrier accumulation mode MOSCAP. In the above-mentioned phase shifters, the free carrier densities in the respective regions may be controlled by the application of electrical voltage to the respective phase shifters causing a phase shift in the optical signal passing through the given region.

Using experimental results, a refractive index change ($\Delta n$) for silicon at the optical wavelengths of 1310 nm and 1550 nm may be expressed using Equations 1 and 2, respectively, as presented below.

$$\Delta n(@1310 \text{ nm}) = -2.98 \times 10^{-22} \times \Delta N^{1.016} - 1.25 \times 10^{-18} \times \Delta P^{0.835} \quad (1)$$

$$\Delta n(@1550 \text{ nm}) = -5.4 \times 10^{-22} \times \Delta N^{1.011} - 1.53 \times 10^{-18} \times \Delta P^{0.838} \quad (2)$$

In Equations 1 and 2, $\Delta N$ and $\Delta P$ represent a change in a free electron density and a change in a hole density, respectively. Based on the above equations, it is understood that the change in the hole density enables a larger refractive shift than the change in the free electrons. For example, even a smaller change in the hole density compared to the change in the electron density produces a larger variation in the refractive index change ($\Delta n$) due to respective different values of the multipliers of $\Delta P$ and $\Delta N$ in the Equations (1)

and (2). Therefore, one way to improve the phase shift efficiency is to generate more holes inside a silicon waveguide. This is generally achieved by forming material regions (e.g., p-type doped regions and n-type doped regions) forming the plasma dispersion effect junctions (e.g., PN junctions or PIN junctions) in the silicon waveguide. However, in the case of silicon waveguides, the plasma dispersion effect is less efficient in generating an increased number of holes. This results in reduced variations in the refractive index of the silicon waveguide, leading to inefficient optical phase shifting. Another commonly used technique to improve the phase shift efficiency involves increasing total free carrier (e.g., both electron and hole) densities inside the silicon waveguide. However, this may lead to increased optical losses due to the absorption of the optical signal by the free carriers.

In accordance with the examples presented herein, an optical device including a phase shifter having an optical waveguide with a PN or PIN junction and a waveguide integrated capacitor is presented. In particular, in some examples, the optical waveguide includes a first semiconductor material region (e.g., a p-type silicon region) and a second semiconductor material region (e.g., an n-type silicon region) formed adjacent to each other and defining a junction (e.g., a PN junction) therebetween. Further, in some examples, a III-V (three-five) semiconductor layer (e.g., having n-type doping) is heterogeneously integrated on the optical waveguide by a thin oxide bonding layer (also referred to as an insulating layer) forming a waveguide integrated capacitor. Accordingly, the proposed phase shifter benefits due to dual control of charge carrier densities in the same optical waveguide. In particular, when a first control voltage (e.g., reverse bias voltage) is applied across the PN junction of the silicon waveguide, a depletion mode phase shifter can be realized in the optical waveguide. Accordingly, free carrier densities on either side of the PN junction may be varied (e.g., reduced) with such applied first control voltage. Similarly, when a second control voltage (e.g., reverse bias voltage) is applied across the silicon waveguide and the III-V semiconductor layer, positive and negative carriers dissipate (e.g., reduce in number) on both sides of the insulating layer (e.g., holes in the first semiconductor material region and electrons in the second semiconductor material region) depending on the magnitude of the applied second control voltage.

The bias voltage (e.g., the second bias voltage) applied across the waveguide integrated capacitor may be determined based on a carrier mode of a junction formed in the optical waveguide. In particular, the first and second bias voltages are applied to cause the change in the charge carrier densities in the waveguide integrated capacitor and a junction (e.g., PN junction or PIN junction) formed in the optical waveguide in the same direction (e.g., either increase or decrease). For example, for the optical waveguide comprising a PN junction operating in a depletion mode (e.g., the first control voltage is a reverse bias voltage), the second bias voltage applied across the waveguide integrated capacitor may also be a reverse bias voltage such that the charge carrier densities in the III-V semiconductor layer and the first semiconductor material region near the insulating layer also reduce. A reduction in the charge carrier densities in a given material increases the refractive index of the given material. Accordingly, in the present case, by operating both the PN junction and the waveguide integrated capacitor with the reverse bias voltages, the charge carrier densities of the PN junction, the III-V semiconductor layer, and the first semiconductor material region can be reduced together resulting in overall bigger change (e.g., increase in this case) in the refractive index. Such an increased change in the refractive index improves a phase-shifting efficiency of the optical device. The term "phase-shifting efficiency" as used herein refers to an amount of phase shift caused in the optical signal per unit length (e.g., per 1 micrometer) of the optical waveguide for a unit change (e.g., per 1 volt) in the applied control voltages.

In another example implementation with the optical waveguide comprising a PIN junction operating in a charge carrier injection mode (e.g., the first control voltage is a forward bias voltage), the second bias voltage applied across the waveguide integrated capacitor may also be set to a forward bias voltage such that charge carrier densities in the III-V semiconductor layer and the first semiconductor material region near the insulating layer also increase. An increase in the charge carrier densities in a given material reduces the refractive index of the given material. Accordingly, in the present case, by operating both the PIN junction and the waveguide integrated capacitor with the forward bias voltages, the charge carrier densities of the PN junction, the III-V semiconductor layer, and the first semiconductor material region can be increased together resulting in overall bigger change (e.g., decrease in this case) in the refractive index. Such an increased change in the refractive index improves the phase-shifting efficiency of the optical device.

The term "forward bias voltage" as used herein may refer to a potential difference between two contact regions such that a potential at a contact region having p-type doping (or having holes as majority charge carriers) is higher than a potential at a contact region having n-type doping (or having electrons as majority charge carriers). Further, the term "reverse bias voltage" as used herein may refer to a potential difference between two contact regions such that a potential at a contact region having p-type doping (or having holes as majority charge carriers) is lower than a potential at a contact region having n-type doping (or having electrons as majority charge carriers).

Also, the heterogeneous integration of the III-V semiconductor layer on the optical waveguide causes an optical mode inside the optical waveguide to overlap with all of the first semiconductor material region, the second semiconductor material region, the insulating layer, and the III-V semiconductor layer, within which the charge carrier densities are varied with the application of the electrical voltages. The optical mode is an electric field distribution of an optical signal passing through the optical waveguide. Generally, the optical mode tends to be confined in the high refractive index medium. Typically, a silicon waveguide is formed in a silicon device layer on top of a buried oxide layer. In the proposed example configuration of the optical device, the III-V semiconductor layer is formed on top of the silicon waveguide via wafer bonding via thin oxide and/or epitaxial growth of the III-V semiconductor layer. The III-V semiconductor layer may have a much higher refractive index in comparison to the oxide. Hence, the optical mode overlaps not only with the first and second semiconductor material regions, but also with the III-V semiconductor layer.

The increased overlap of the optical mode with the material layers of the phase shifter further enhances the phase shift efficiency because of the control of charge carrier densities in the first semiconductor material region (near the PN junction and the insulating layer), in the second semiconductor material region (near the PN junction), and in the III-V semiconductor layer (near the insulating layer) using control voltages. In particular, the change in the material properties (e.g., charge carrier concentrations) in a given region caused due to the application of the control voltages is effective when an optical mode of the optical signal also appears in the same region thereby causing the phase shift in the optical signal. In some examples, the proposed phase shifter structure with the optical waveguide having a PN junction, and the heterogeneously integrated III-V semiconductor layer achieves up to about 43.8% improvement in the effective refractive index of the optical waveguide compared to an individual standalone biasing of the PN junction. Such significant improvement in the effective refractive index is achieved at least in part due to the overlap of the optical mode with all of the first semiconductor material region, the second semiconductor material region, the insulating layer, and the III-V semiconductor layer.

Furthermore, with the use of two control voltages (e.g., the first voltage across the waveguide integrated capacitor and the second voltage across the PN junction of the optical waveguide) to control the carrier densities, more complex functionality of tuning capabilities may be achieved with wider control of the refractive index. For example, by implementing such a phase shifter that is controlled using two different control voltages in optical modulators, a non-return to zero (NRZ) modulation with larger optical modulation amplitude (OMA) with two synchronous NRZ electrical signals and a pulse amplitude modulation 4-level (PAM4) modulation with two separate NRZ electrical signals may be achieved. Also, because an optical phase shifter is a fundamental component of photonic integrated circuits, many optical devices can be realized with the example highly-efficient optical phase shifter to achieve higher performance. Moreover, with the heterogeneous integration of the III-V semiconductor layer on silicon, the resulting photonic integrated circuit remains highly compatible with other semiconductor fabricating processes allowing easier integration of such photonic integrated circuits with other optical and non-optical devices.

Referring now to the drawings, in FIG. 1, a cross-sectional view 100 of an example optical device 102 having an integrated phase shifter 101 is presented. The optical device 102 may be representative of any optical device that entails phase shifting an optical signal. For example, the optical device 102 may be an optical modulator such as a ring modulator or a linear modulator. In another example, the optical device 102 may be an MZI. In some examples, the optical device 102 may form a part of a photonic integrated circuit. In one example implementation, the photonic integrated circuit may be implemented in an optical transceiver. The optical transceiver, in some examples, is disposed in an electronic system such as but not limited to, computers (stationary or portable), servers, storage systems, wireless access points, network switches, routers, docking stations, printers, or scanners.

In some examples, the optical device 102 may include an optical waveguide 104 and a waveguide integrated capacitor 106, and electrical contact structures 108A, 108B, and 108C. In the example implementation of FIG. 1, three electrical contact structures 108A-108C are shown for illustration purposes. In some other examples, the optical device 102 may include a fewer or greater number of electrical contact structures. During the operation of the optical device 102, the optical waveguide 104 may allow passage of light therethrough, and control voltages may be applied to the electrical contact structures 108A-108C to cause a phase shift in the optical signal passing through the optical waveguide 104. In some examples, a wavelength of the optical signal passing through the optical waveguide 104 may be in a range from 1100 nanometers (nm) to 2000 nm. The optical mode marked (using dashed circle 107, hereinafter referred to as optical mode 107) also overlaps with the waveguide integrated capacitor 106. The amount of phase shift caused in the optical signal may be proportional to the magnitude and/or polarities of such control voltages.

In some examples, the optical waveguide 104 may be formed using a semiconductor material, for example, silicon (Si), indium phosphide (InP), gallium arsenide (GaAs), silicon carbide (SiC), aluminum gallium arsenide (AlGaAs), indium gallium arsenide (InGaAs), or combinations thereof. For illustration purposes, in FIG. 1 and in the rest of the drawings, the optical waveguide 104 is described as formed using silicon. The optical waveguide 104 may be formed in a variety of shapes depending on their respective applications. For example, the optical waveguide 104 may have a linear shape, a non-linear shape, or an annular shape, such as a ring shape or a loop shape (e.g., circular loop, oval loop, rounded rectangle loop, rounded square loop, rounded triangle loop, etc.). In some examples, the optical waveguide 104 may have an elongated loop shape (e.g., a racetrack shape).

The optical waveguide 104 may include a first semiconductor material region 110 and a second semiconductor material region 112 (hereafter referred to as waveguide regions 110 and 112) formed adjacent to each other and defining a junction 114 therebetween. In an implementation where the optical waveguide 104 has an annular shape, the waveguide regions 110 and 112 may also be formed in annular shapes. Both the waveguide regions 110 and 112 may be formed of the same material (e.g., silicon), but are differently doped. For example, the waveguide region 110 may include a first type of doping and the waveguide region 112 may include a different second type of doping. For illustration purposes, the first-type doping is described as p-type and the second-type doping is described as n-type. In other examples, the first-type doping may be n-type and the second-type doping may be p-type. For illustration purposes, in the description hereinafter and in the drawings, waveguide regions 110 and 112 are shown to include p-type doping and n-type doping, respectively.

The n-type doping may be achieved by doping a respective semiconductor material with impurities having donor ions including, but not limited to, phosphorus (P), arsenic (As), antimony (Sb), or bismuth (Bi). Accordingly, the semiconductor material with n-type doping may have electrons in excess of holes. In the semiconductor material with n-type doping, the electrons that are in excess of the holes are also referred to as free electrons which act as free charge carriers. The p-type doping may be achieved by doping a respective semiconductor material with impurities having acceptor ions including, but not limited to, boron (B), gallium (Ga), indium (In), or aluminum (Al). Accordingly, the semiconductor material with p-type doping may have holes in excess of electrons. In the semiconductor material with p-type doping, the holes that are in excess of the electrons are also referred to as free holes which act as free charge carriers. The n-type doping or p-type doping may be achieved by using techniques such as impurity diffusion, ion implantation, in-situ doping, and the like. In the description hereinafter, the term "free charge carriers" or "free carriers" may represent the free electrons with reference to the semiconductor material when having n-type doping. Further, the term "free charge carriers" or "free carriers" may represent the free holes with reference to the semiconductor material when having p-type doping.

The differently doped waveguide regions 110, 112 are formed adjacent to each other, thereby defining the junction 114 (e.g., a PN junction) at the boundaries of the waveguide regions 110, 112 contacting each other. Further, in some examples, the waveguide regions 110, 112 may be shaped to achieve a larger junction area between the waveguide regions 110, 112. For example, in the implementation of FIG. 1, the waveguide regions 110 and 112 are shaped to achieve an L-shaped junction 114. In particular, the waveguide region 112 may be formed to have a rectangular cross-section and the waveguide region 110 is formed to have an L-shaped cross-section having a short side and a long side, for example. The optical waveguide 104 may be formed such that at least a portion of the waveguide region 110 is formed over the waveguide region 112, and wherein an insulating layer 116 is formed on top of the first waveguide region 110, as depicted in FIG. 1.

Further, in some examples, the waveguide integrated capacitor 106 may be formed via the optical waveguide 104, the insulating layer 116, and a III-V semiconductor layer 118. The III-V semiconductor layer 118 may be formed of III-V semiconductor materials such as InP, GaAs, AlGaAs, InGaAs, InAs, or combinations thereof. For illustration purposes, in FIG. 1 and in the rest of the drawings, III-V semiconductor layer 118 is described as formed of GaAs. The insulating layer 116 is formed on top of the optical waveguide 104 as depicted in FIG. 1. In particular, insulating layer 116 is formed such that the insulating layer 116 is sandwiched between the waveguide region 110 and the III-V semiconductor layer 118. The insulating layer 116 may be formed of one or more dielectric materials, including but not limited to, native oxides of the materials of the optical waveguide 104 or the III-V semiconductor layer 118, or both, or external dielectric materials such as high-k dielectrics or polymers which can be formed by deposition, oxidation, wafer bonding or other dielectric coating methods. Examples of the dielectric materials that can be used to form the insulating layer 116 may include, silicon dioxide ($SiO_2$), silicon nitride ($Si_3N_4$), aluminum oxide ($Al_2O_3$), hafnium dioxide ($HfO_2$), polyimide, benzocyclobutene (BCB), or combinations thereof.

The III-V semiconductor layer 118 may be formed on top of the insulating layer 116. In particular, the III-V semiconductor layer 118 may be heterogeneously integrated on the optical waveguide 104 by a thin oxide bonding layer, for example, the insulating layer 116. In some examples, due to the heterogeneous integration of the III-V semiconductor layer 118 on the optical waveguide, the optical mode 107 overlaps across the first semiconductor material region, the second semiconductor material region, the insulating layer, and the III-V semiconductor layer, within which the charge carrier densities are varied with the application the control voltages (described later). Such an increased overlap of the optical mode 107 with the material layers of the phase shifter with such variable charge carrier densities further enhances the phase shift efficiency.

In some examples, the phase shifter 101 may receive control voltages via the electrical contact structures 108A-108C to control the phase shift in the optical signal passing through the optical waveguide 104. Each of the electrical contact structures 108A-108C may include one or both of a semiconductor-based highly doped contact region and metal contact. To cause a phase shift in the optical signal passing through the optical waveguide 104, a first control voltage (e.g., reverse bias voltage) may be applied across the PN junction 114. This may be achieved by applying the first control (e.g., a reverse bias voltage) voltage across the waveguide regions 110 and 112 via the respective electrical contact structures 108A and 108B. For example, when the reverse bias voltage is applied across the electrical contact structures 108A and 108B, the PN junction 114 is said to be operated in a charge carrier depletion mode. In the charge carrier depletion mode, a depletion region 115 at the PN junction 114 may increase in size due to the reduction in the charge carrier density near the PN junction 114 between the waveguide regions 110 and 112. In particular, in the depletion 115, there exist no majority charge carriers (e.g., electrons in the n-type Si and holes in the p-type Si) due to the applied reverse bias voltage. Typically, in the depletion region 115, minority charge carriers (e.g., holes in the n-type Si and electrons in the p-type Si) remain and these are very small in quantity compared to the majority charge carriers. Such an overall reduction in the charge carrier density may cause an increase in the refractive index of the optical waveguide 104. In particular, upon application of the first control voltage, the refractive index within the optical waveguide 104 may increase due to the increased size of the depletion region 115.

In addition, in some examples, a second control voltage (e.g., reverse bias voltage) may be applied across the waveguide integrated capacitor 106 such that charge carriers dissipate from both the sides of the insulating layer 116. When such control voltage causing dissipation of charge carriers is applied, the waveguide integrated capacitor 106 is said to be operating in a charge carrier dissipation mode. In particular, when the reverse bias voltage is applied across the electrical contact structures 108A and 108C, electrons dissipate from the III-V semiconductor layer 118, and holes dissipate from the waveguide region 110 causing a decrease in the density of the electrons and holes in the III-V semiconductor layer 118 and the waveguide region 110, respectively, near the insulating layer 116. Such a decrease in the density of the holes and electrons causes an increase in the refractive indexes of respective material regions.

Also, in the proposed structure of the phase shifter 101, because the heterogeneously integrated the III-V semiconductor layer 118 has a much higher refractive index in comparison to the insulating layer 116, the optical mode 107 of the optical signal passing through the optical waveguide 104 overlaps with the III-V semiconductor layer 118 along with the waveguide regions 110 and 112. With the application of the first and second control voltages, the charge carrier densities are varied in the waveguide regions 110, 112, and the III-V semiconductor layer 118 with overlapping optical mode 107 resulting in an improvement in the phase-shifting efficiency. Moreover, in the example implementation of the optical device 102, the first and second control voltages are applied such that charge carrier densities in the waveguide integrated capacitor 106 and the depletion region 115 near the PN junctions are decreased simultaneously. Such a simultaneous decrease in the charge carrier densities results in a large increase in the refractive index causing improved phase-shifting efficiency. As will be described later, in some examples, the proposed phase shifter structure with PN junction optical waveguide 104 and the heterogeneously integrated III-V semiconductor layer 118 achieves up to about 43.8% improvement in the effective refractive index compared to individual standalone biasing of the PN junction 114.

In some examples, the both the PN junction 114 and the waveguide integrated capacitor 106 are operated with forward bias voltages. This results in the accumulation of charges near the PN junction 114 and the insulating region 116 of the waveguide integrated capacitor 106 causing an overall larger decrease in the refractive index of the optical waveguide 104. Such a large decrease in the refractive index also improves the phase-shifting efficiency of the optical device.

Moreover, in some examples, the first control voltage applied across the PN junction 114 and/or the second control voltage applied across the waveguide integrated capacitor 106 may be modulated by a modulating signal (not shown in FIG. 1). In particular, when the first control voltage is modulated, the refractive index within the optical waveguide 104 near the PN junction 114 may vary in accordance with such modulating signal. Similarly, when the second control voltage is modulated, the refractive index within the optical waveguide 104 near the insulating layer 116 and the refractive index of the III-V semiconductor layer 118 may vary in accordance with the modulating signal. This results in a modulation of the optical signal passing through the optical waveguide 104 based on the modulating signal. In some examples, the modulating signals applied across the PN junction 114 and the waveguide integrated capacitor 106 may be different from each other.

Figure 2:
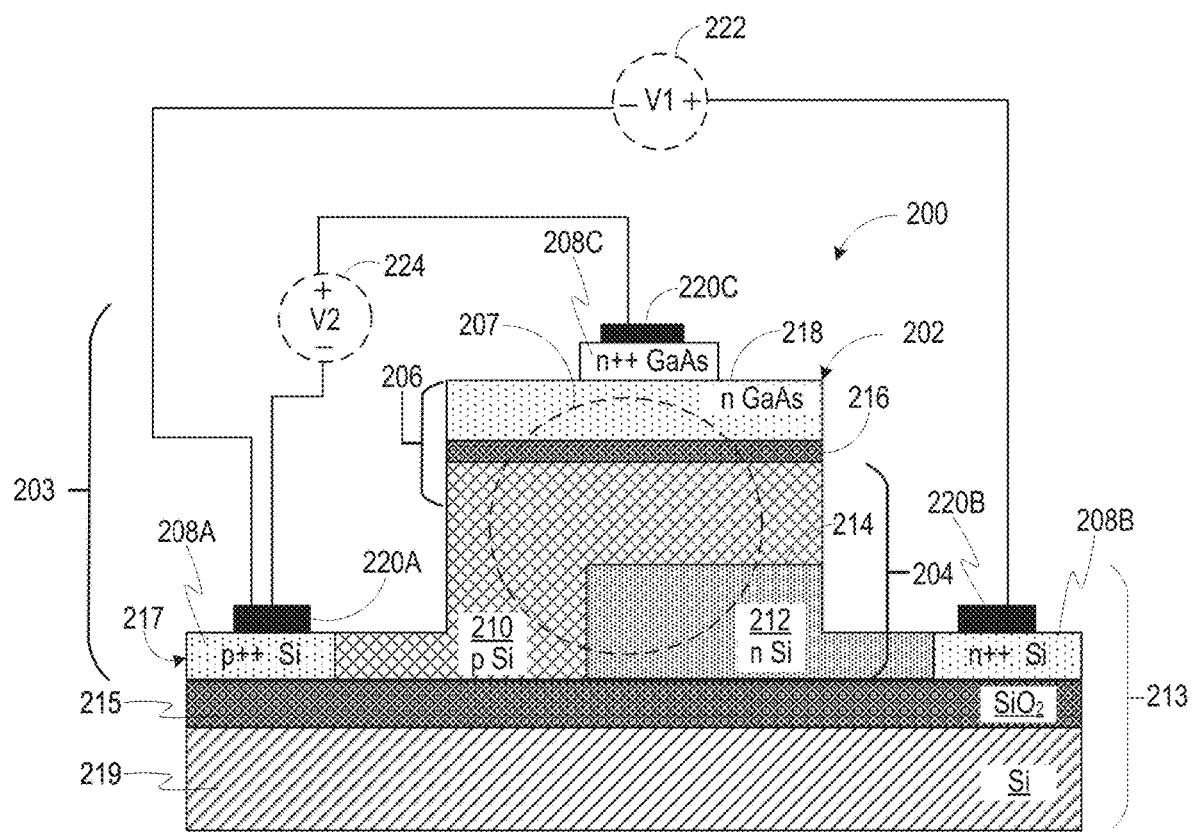
FIG. 2 depicts a cross-sectional view of another example optical device.

Referring now to FIG. 2, a cross-sectional view 200 of an example optical device 202 is presented. The optical device 202 may be an example representative of the optical device 102. The optical device 202 may include a device structure 203 formed on a substrate 213. The device structure 203 may include an optical waveguide 204 and a waveguide integrated capacitor 206 that are example representatives of the optical waveguide 104 and the waveguide integrated capacitor 106, described in FIG. 1.

The substrate 213 may be a silicon on insulator (SOI) substrate. In some examples, the substrate 213 may include a base substrate layer 219, a base oxide layer 215, and a device layer 217. The base substrate layer 219 may be made of semiconductor material, for example, silicon (Si). Other examples of materials that may be used to form the base substrate layer 219 may include III-V semiconductors, such as InP, GaAs, AlGaAs, or combinations thereof. Further, as depicted in FIG. 2, the substrate 213 may include a base oxide layer 215 disposed on an underlying base substrate layer 219. For example, the base oxide layer 215 may be formed by oxidizing the substrate 213. In the implementation of FIG. 2, for the base substrate layer 219 made of silicon, the base oxide layer 215 may comprise $SiO_2$, which may be formed in the presence of oxygen at a temperature in the range from 900° C. to 1380° C. In some examples, the base oxide layer 215 may be a buried oxide (BOX) layer (e.g., the $SiO_2$ may be buried in the base substrate layer 219). In some examples, a layer of $SiO_2$ may be buried in the base substrate layer 219 at a depth ranging from less than 100 nm to several micrometers from the wafer surface depending on the application. Other examples of the base oxide layer 215 may include, but are not limited to, $Si_3N_4$, $Al_2O_3$, $HfO_2$, diamond, SiC, or combinations thereof.

Further, the device layer 217 is disposed on top of the base oxide layer 215. In the example implementation of FIG. 2, the device layer 217 is composed of silicon. The device layer 217 may be suitably shaped (e.g., via techniques such as photolithography and etching) to form one or more regions, such as, the optical waveguide 204 and contact regions such as a first contact region 208A and the second contact region 208B. The optical waveguide 204 may be an example representative of the optical waveguide 104 and include waveguide regions 210 and 212 formed adjacent to each other and defining a PN junction at the boundaries of waveguide regions 210 and 212 that contact each other. Also, the waveguide integrated capacitor 206 may be formed via the waveguide region 210, an insulating layer 216, and a heterogeneously integrated III-V semiconductor layer 218 on top of the insulating layer 216. Also, the device structure 203 may include a third contact region 208C. The contact regions 208A, 208B, and 208C and respective metal contacts 220A, 220B, and 220C form electrical contact structures for the optical device 202.

For illustration purposes, in FIG. 2, the contact regions 208A-208B are shown as made of silicon, and the contact region 208C is shown as made of GaAs. In some other examples, the contact regions 208A-208C may be made of other semiconductor materials including, but not limited to, InP, GaAs, AlGaAs, or combinations thereof. The first contact region 208A may include the first-type doping (e.g., p-type doping) and is formed in contact with the waveguide region 210. Further, the second contact region 208B may include the second-type doping (e.g., n-type doping) and is formed in contact with the waveguide region 212. Further, the third contact region 208C may include the second-type doping (e.g., n-type doping) and is formed in contact with the III-V semiconductor layer 218. In some examples, for good metal contact resistance, the contact regions 208A-208C may have a higher concentration of respective doping in comparison to doping concentrations in the waveguide regions 210, 212, and the III-V semiconductor layer 218. Accordingly, the contact regions 208A-208C may be considered highly doped regions and are marked with labels "n++" and "p++" as depicted in FIG. 2.

Moreover, in some examples, the optical device 202 may include metal contacts, such as, a first metal contact 220A, a second metal contact 220B, and a third metal contact 220C (hereinafter collectively referred to as metal contacts 220A-220C). As depicted in FIG. 2, the first metal contact 220A and the second metal contact 220B are respectively formed in electrical contact (e.g., in direct physical contact or via any intermediate electrically conductive material) with the waveguide regions 210 and 212. The third metal contact 220C is formed in electrical contact with the III-V semiconductor layer 218. In some examples, the metal contacts 220A, 220B, and 220C may be formed on top of (i.e., vertically over) the waveguide regions 210, 212, and the III-V semiconductor layer 218, respectively. Examples of materials used to form the metal contacts 220A-220C may include, but are not limited to, copper (Cu), gold (Au), Al, and/or platinum (Pt).

During the operation of the optical device 202, the optical waveguide 204 may allow passage of the light therethrough, and control voltages (V1 and V2) may be applied to the metal contacts 220A-220C to cause a phase shift in the optical signal passing through the optical waveguide 204. In particular, control voltages are applied to the PN junction 214 and the waveguide integrated capacitor 206 to simultaneously increase the charge carrier densities near PN junction 214 and in the waveguide integrated capacitor 206. In particular, in the example implementation of FIG. 2, both the control voltages V1 and V2 may be reverse bias voltages. For example, a power source 222 may be connected to the contacts 220A and 220B to apply the first reverse bias voltage (V1). Accordingly, the PN junction 214 may be operated in a charge carrier depletion mode.

Further, in some examples, a second reverse bias voltage (V2) may be applied to the waveguide integrated capacitor 206. In particular, a power source 224 may be connected to the contacts 220A and 220C to apply the second reverse bias voltage (V2) to the waveguide integrated capacitor 206. Due to the application of the second reverse bias voltage (V2), the waveguide integrated capacitor 206 may be operated in a charge carrier dissipation mode. In some examples, the reverse bias voltages V1 and V2 may be modulated by modulating signals (same or different) representative of data to be transmitted (for example) to achieve desired light modulation. Accordingly, in the present case, by operating both the PN junction 214 and the waveguide integrated capacitor 206 with the reverse bias voltages, the charge carrier densities of the PN junction, the III-V semiconductor layer, and the first semiconductor material region can be reduced together resulting in overall bigger change (e.g., increase in this case) in the refractive index.

Figure 3A:
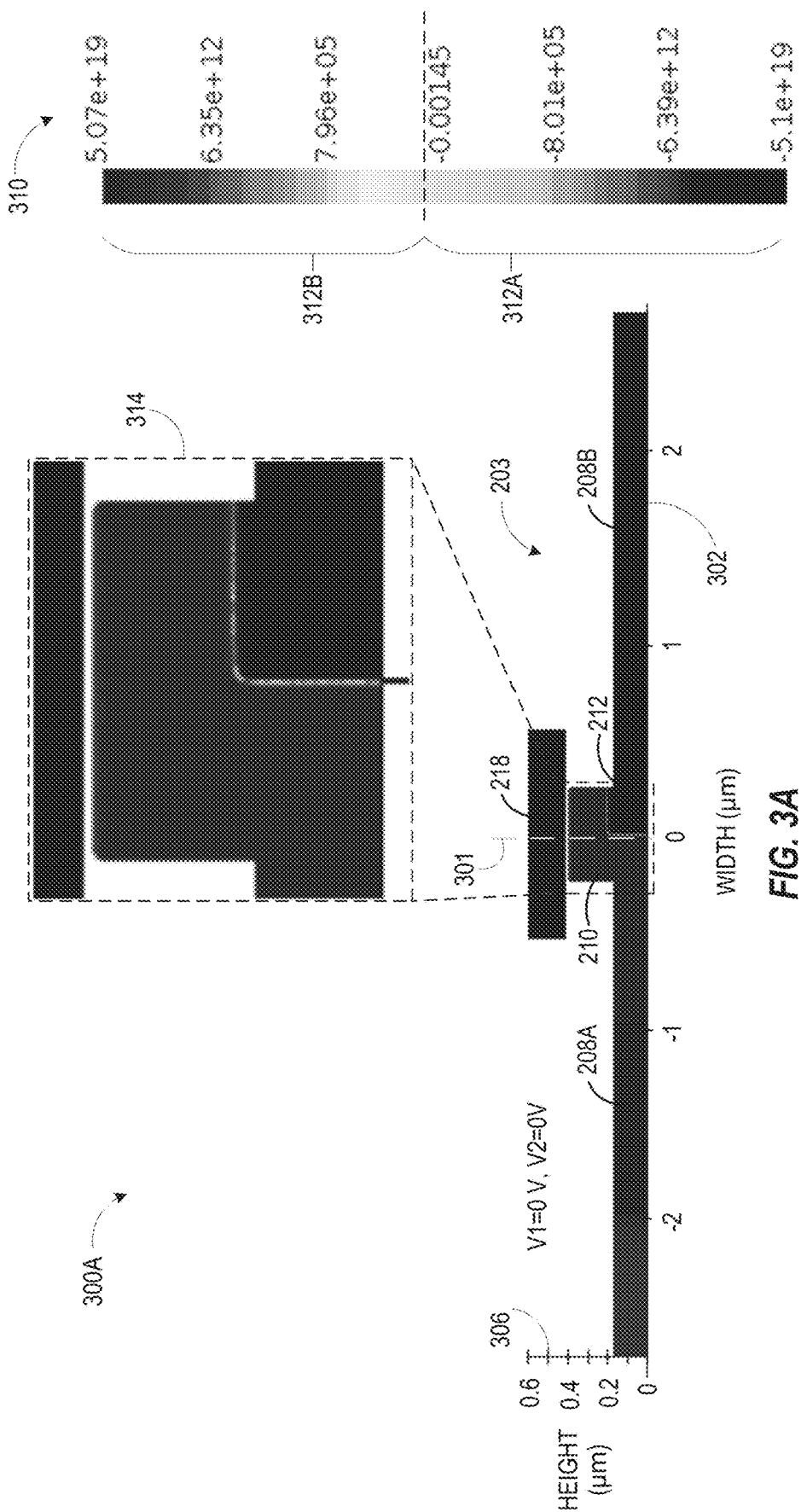
FIGS. 3A and 3B respectively depict graphical representations of simulated distributions of free charge carriers for different settings of the control voltages for the example optical device of FIG. 2.
Figure 3B:
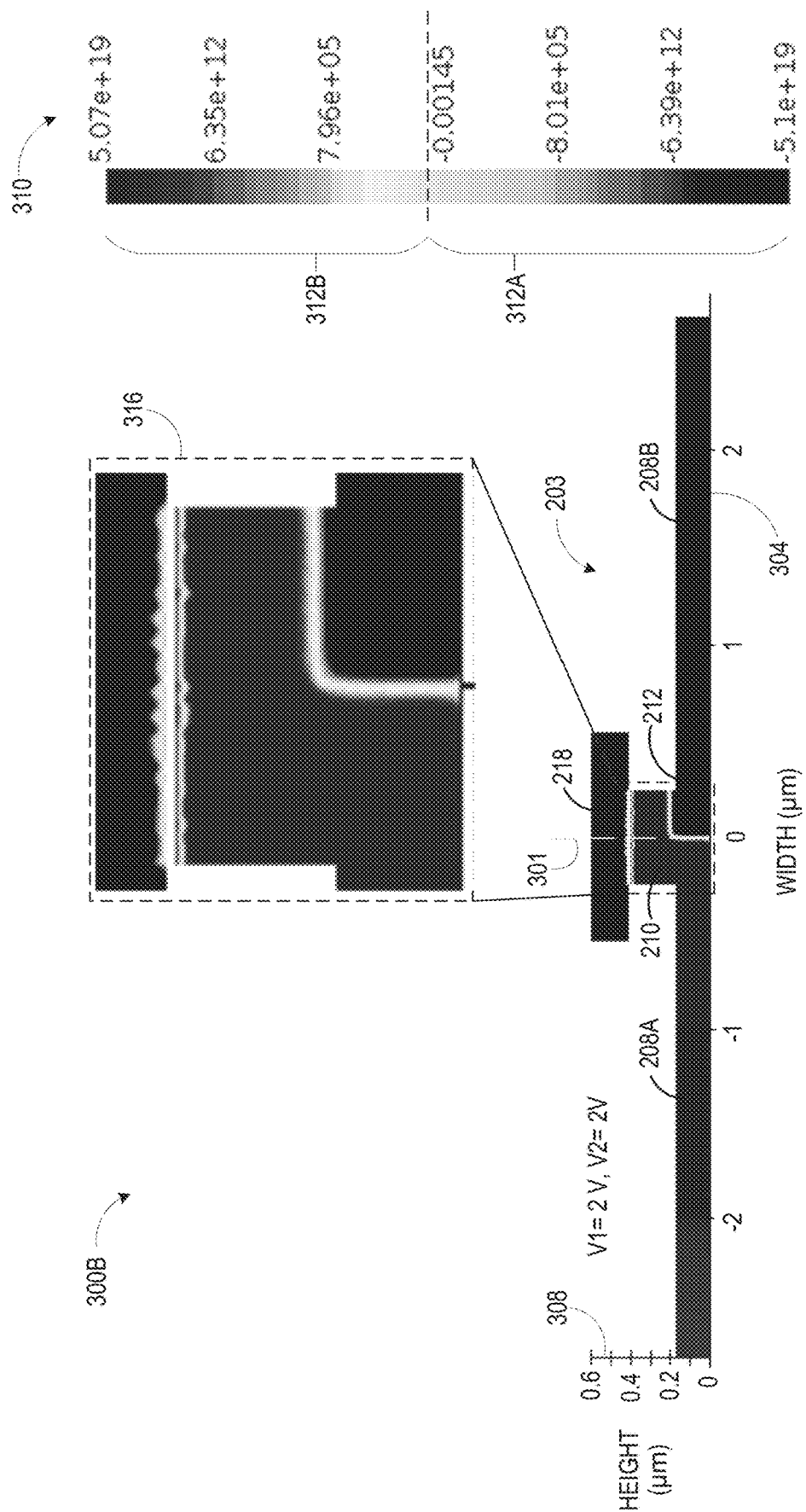

FIGS. 3A and 3B respectively represent graphical representations 300A and 300B depicting simulated distributions of the free charge carriers for different settings of the control voltages (e.g., the reverse bias voltages V1 and V2) for the example optical device 202 of FIG. 2. In particular, in the graphical representations 300A and 300B, only the device structure 203 (without metal contacts) is depicted to Illustrate distributions of the free charge carders. In the graphical representations 300A and 300B, X-axis 302 and 304 represent a width in μm with reference to an imaginary center line 301 that divides the device stricture 203 into two equal parts. Further, the Y-axis 306 and 308 represent structure heights in μm. A charge density distribution scale 310 represent the distribution of free carrier densities. In particular, the graphical representation 300A depicts the simulated distributions of the free charge carriers when both the voltages V1 and V2 are set to 0 (zero) volts (V), hereinafter referred to as a first biasing condition. The graphical representation 300B depicts the simulated distributions of the free charge carriers when both the voltages V1 and V2 are set to 2 (two) V, hereinafter referred to as a second biasing condition. The graphical representations of FIGS. 3A and 3B are obtained using simulations performed using photonic simulation software.

For these simulations, thicknesses of the insulating layer 216, the optical waveguide 204, and the III-V semiconductor layer 218 are respectively set to 10 nm, 400 nm, and 190 nm. Also, for the purpose of these simulations, the materials of the insulating layer 216, the optical waveguide 204, and the III-V semiconductor layer 218 are chosen to be $Al_2O_3$, silicon, and GaAs, respectively. As depicted in the enlarged views 314 and 316, a charge carrier profile corresponding to the second biasing condition is different from a charge carrier profile corresponding to the first biasing condition. In particular, the difference in the charge carrier profiles is observed prominent near the PN junction and the insulating layer of the waveguide integrated capacitor structure for the second biasing condition (e.g., when V1=V2=2 Volts) in comparison to the first biasing condition (e.g., when V1=V2=0 volt). In particular, in the graphical representations 300A and 300B, the waveguide region 212, the contact region 208B, and the III-V semiconductor layer 218 have electrons as majority carriers and corresponding free carrier density (e.g., electron density) is read from a lower half 312A of the charge density distribution scale 310. Similarly, in the graphical representations 300A and 300B, the waveguide region 210 and the contact region 208A have holes as majority carriers and corresponding free carrier density (e.g., hole density) is read from an upper half 312B of the charge density distribution scale 310.

Further, based on such spatial distributions of charge carriers, the photonic simulation software is configured to calculate an effective refractive index ($n_{eff}$) of an optical waveguide (e.g., the optical waveguide 204) corresponding to the different settings of the voltages V1 and V2 (e.g., biasing conditions). Table-1 presented below represents example values of the effective refractive index $n_{eff}$ of the optical waveguide for given magnitudes of the control voltages V1 and V2.

TABLE 1

Example of effective refractive indexes

| V1 | V2 | $n_{eff(V1, V2)}$ | $\Delta n$ (with reference to the unbiased condition and based on real values of $n_{eff}$) |
|---|---|---|---|
| 0 | 0 | $n_{eff(0, 0)}$ = 3.170105 + 8.414270e−7i | $\Delta_{n1}$ = Re $n_{eff(0, 0)}$ − Re $n_{eff(0, 0)}$ = 0 |
| 0 | 2 | $n_{eff(0, 2)}$ = 3.170119 + 8.191513e−7i | $\Delta_{n2}$ = Re $n_{eff(0, 2)}$ − Re $n_{eff(0, 0)}$ = 0.000014 |
| 2 | 0 | $n_{eff(2, 0)}$ = 3.170137 + 7.900994e−7i | $\Delta_{n3}$ = Re $n_{eff(2, 0)}$ − Re $n_{eff(0, 0)}$ = 0.000032 |
| 2 | 2 | $n_{eff(2, 2)}$ = 3.170151 + 7.678920e−7i | $\Delta_{n4}$ = Re $n_{eff(2, 2)}$ − Re $n_{eff(0, 0)}$ = 0.000046 |

From Table-1, it is observed that in comparison to biasing PN junction alone with 2 volts (i.e., V1=2 V and V2=0 V), the proposed dual control with V1=V2=2V results in about 43.8% (=$\Delta n_4/\Delta n_3$) improvement in the effective refractive index. In particular, when both the PN junction 214 and the waveguide integrated capacitor 206 are biased at 2 volts (e.g., V1=V2=2V), the effective refractive index increases to 3.170151 causing the refractive index change ($\Delta n_4$) which is about 43.8% higher in comparison to the refractive index change ($\Delta n_3$) caused by standalone biasing of the PN junction 214 (e.g., when V1=2, V2=0V).

Figure 4:
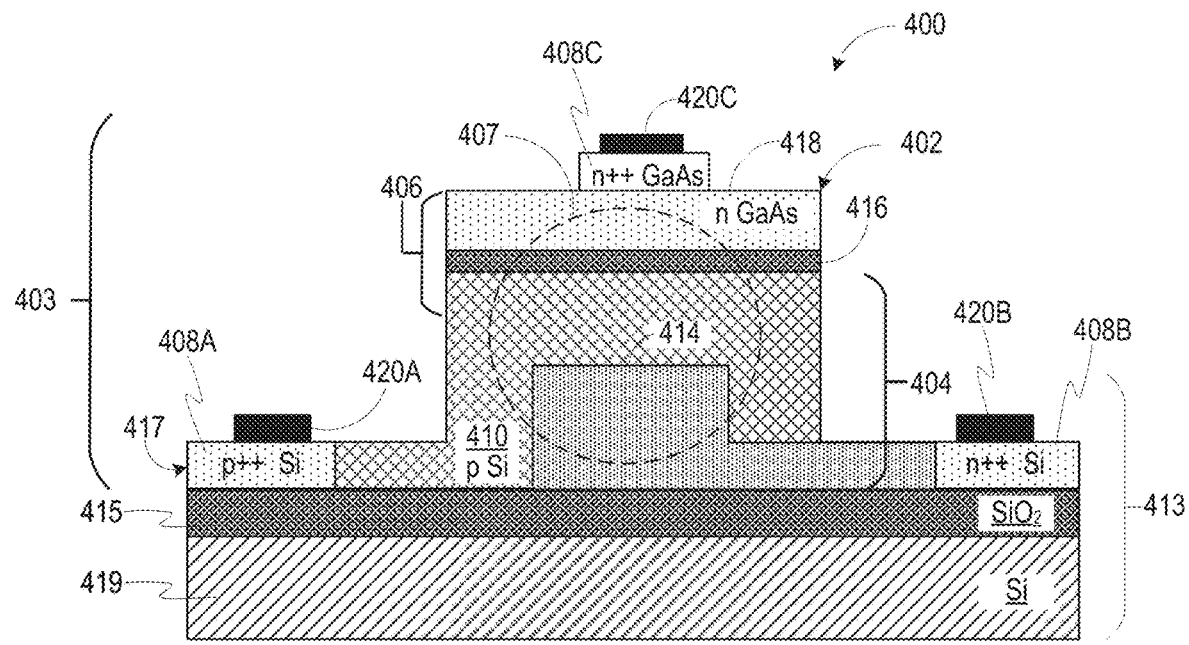
FIG. 4 depicts a cross-sectional view of another example optical device.

Turning now to FIG. 4, a cross-sectional view 400 of an example optical device 402 is presented. The optical device 402 may be an example representative of the optical device 202 of FIG. 2 and includes several structural layers and aspects similar to those described in FIG. 2, details of which are not repeated herein. For example, the optical device 402 may include a device structure 403 formed on a substrate 413. The device structure 403 may include an optical waveguide 404 and a waveguide integrated capacitor 406 that are example representatives of the optical waveguide 104 and the waveguide integrated capacitor 106, described in FIG. 1. The substrate 413 may include a base substrate layer 419, a base oxide layer 415, and device layer 417 similar to those described in FIG. 2.

The device layer 417 may be suitably shaped (e.g., via techniques such as photolithography and etching) to form one or more regions, such as, the optical waveguide 404 and contact regions such as a first contact region 408A and the second contact region 408B. The optical waveguide 404 may be an example representative of the optical waveguide 104 and include waveguide regions 410 and 412. Also, the waveguide integrated capacitor 406 may be formed via the waveguide region 410, an insulating layer 416, and a heterogeneously integrated III-V semiconductor layer 418 on top of the insulating layer 416. In particular, the contact region 408A is formed in contact with the waveguide region 410, and the contact region 408B is formed in contact with the waveguide region 412. Further, the device structure 403 may include a third contact region 408C formed on top of the III-V semiconductor layer 418. Furthermore, metal contacts 420A, 420B, and 420C are formed in electrical contact with the contact regions 408A, 408B, and 408C, respectively.

The waveguide regions 410 and 412 are formed adjacent to each other thereby defining a PN junction 414 at the boundaries of waveguide regions 410 and 412 that contact each other. In particular, in the example implementation of FIG. 4, the waveguide regions 410 and 412 may be shaped to achieve a larger junction area between the waveguide regions 410 and 412. For example, in the implementation of FIG. 4, the waveguide regions 410 and 412 are shaped to achieve an inverter U-shaped junction 414. The waveguide region 410 may be formed on top of the waveguide region 412 such that three sides of the waveguide regions 410 and 412 contact each other resulting in the inverted U-shaped or C-shaped junction 414 between the waveguide regions 410 and 412. Such inverted U-shaped or C-shaped junction 414 provides a large contact surface between the waveguide regions 410 and 412 providing greater control of charge carrier densities in the optical waveguide 404. This enhanced control of charge carrier densities may improve the phase-shifting efficiency of the optical device 402. Also, an optical mode 407 of the optical signal passing through the optical waveguide 404 also overlaps with the waveguide regions 410, 412, the insulating layer 416, and the III-V semiconductor layer 418 which improves the phase-shifting efficiency of the optical device 402.

In some examples, control voltages (e.g., reverse bias voltages) for the optical waveguide 404 and the waveguide integrated capacitor 406 may be applied to the optical device 402 via the metal contacts 420A, 420B, and 420C. In some examples, on the application of the control voltages, the PN junction 414 is operated in the charge carrier depletion mode and the waveguide integrated capacitor 406 is operated in the charge carrier dissipation mode. Therefore, charge carrier densities about the PN junction 414 in the optical waveguide 404, and the insulating layer 416 in the waveguide integrated capacitor 406 may be reduced simultaneously, resulting in a greater overall increase in the refractive index.

Figure 5:
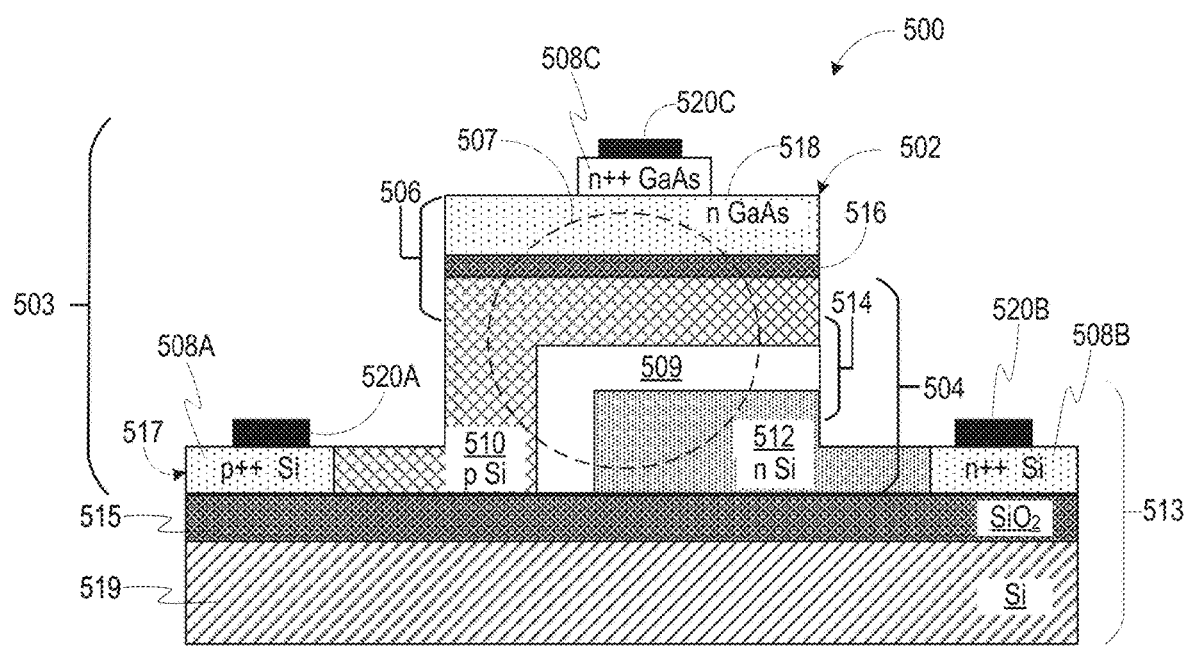
FIG. 5 depicts a cross-sectional view of yet another example optical device.

Turning now to FIG. 5, a cross-sectional view 500 of an example optical device 502 is presented. The optical device 502 may be an example representative of the optical device 202 of FIG. 2 and includes several structural layers and aspects similar to those described in FIG. 2, details of which are not repeated herein. For example, the optical device 502 may include a device structure 503 formed on a substrate 513. The device structure 503 may include an optical waveguide 504 and a waveguide integrated capacitor 506 that are example representatives of the optical waveguide 204 and the waveguide integrated capacitor 206, described in FIG. 2. The substrate 513 may include a base substrate layer 519, a base oxide layer 515, and device layer 517 similar to those described in FIG. 2.

The device layer 517 may be suitably shaped (e.g., via techniques such as photolithography and etching) to form one or more regions, such as, the optical waveguide 504 and contact regions such as a first contact region 508A and the second contact region 508B. In particular, in comparison to the optical waveguide 204 of FIG. 2 which has a PN junction 214, the optical waveguide 504 is formed to have PIN junction 514. The optical waveguide 504 also includes waveguide regions 510 and 512 which are example representatives of the waveguide regions 210 and 212, respectively. In addition, in this example, the optical waveguide 504 includes an intrinsic semiconductor material region 509 sandwiched between the waveguide regions 210 and 212. The waveguide regions 210, 212, and the intrinsic semiconductor material region 509 sandwiched therebetween form the PIN junction 514. Although the PIN junction 514 having an L-shape is shown in FIG. 5, the use of PIN junctions of different shapes is envisioned within the purview of the present disclosure. An optical mode 507 of the optical signal passing through the optical waveguide 504 also overlaps with the intrinsic semiconductor material region 509.

Moreover, the waveguide integrated capacitor 506 may be formed via the waveguide region 510, an insulating layer 516, and a heterogeneously integrated III-V semiconductor layer 518 on top of the insulating layer 516. Further, the device structure 503 may include a third contact region 508C formed on top of the III-V semiconductor layer 418. Also, metal contacts 520A, 520B, and 520C may be formed in electrical contact with the contact regions 508A, 508B, and 508C, respectively.

During the operation of the optical device, the PIN junction 514 may be operated in a charge carrier injection mode by applying a first control voltage. The first control voltage in the example implementation of FIG. 5 is a forward bias voltage. In particular, the first control voltage may be applied such that an electrical potential at the contact region 508A is higher than the electrical potential at the contact region 508B. When the PIN junction 514 is operated under such forward bias voltage, charge carriers are injected into the intrinsic semiconductor material region 509 due to a forward electric-field caused by the first control voltage. Therefore, the carrier density increases in the intrinsic semiconductor material region 509. In particular, the increase in the carrier density reduces the refractive index of the intrinsic semiconductor material region 509.

Further, in the example implementation of FIG. 5, the waveguide integrated capacitor 506 may be operated in the charge carrier accumulation mode by applying a forward bias second control voltage to the waveguide integrated capacitor 506. In particular, the second control voltage may be applied such that an electrical potential at the contact region 508A is higher than the electrical potential at the contact region 508C. When the waveguide integrated capacitor 506 is operated under such forward bias voltage, the carriers are accumulated on either side of the insulating region 516 in the III-V semiconductor layer 518 and the waveguide region 510 due to a forward electric-field caused by the second control voltage. Therefore, the charge carrier density increases in the III-V semiconductor layer 518. In particular, the increase in the charge carrier density reduces the refractive index of the intrinsic semiconductor material region 509. In some examples, by simultaneously operating the waveguide integrated capacitor 506 and the PIN junction 514 with the forward bias voltages, greater overall change (e.g., reduction) in the carrier densities can be achieved causing bigger refractive index change. This results in enhanced phase-shifting efficiency.

Figure 6:
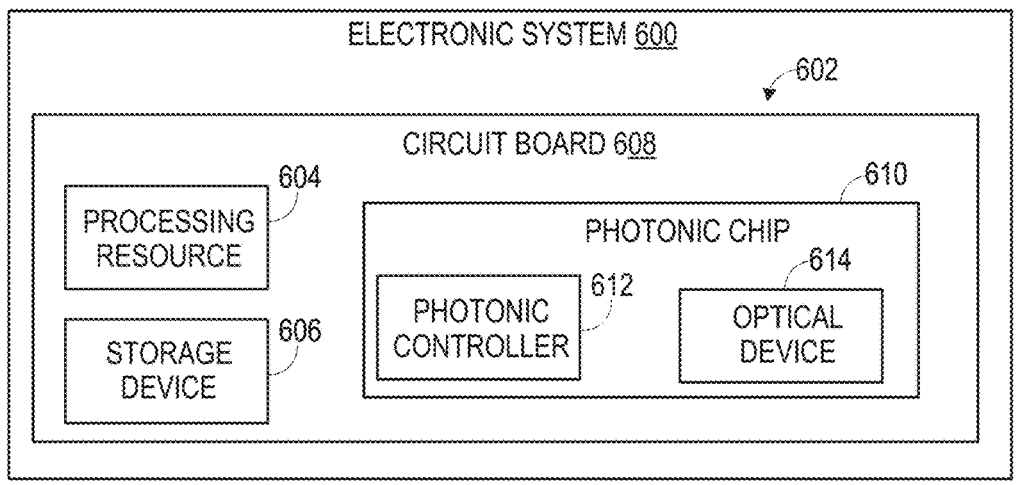
FIG. 6 depicts a block diagram of an example electronic system hosting an example optical device.

Referring now to FIG. 6, a block diagram of an example electronic system 600 is presented. Examples of the electronic system 600 may include, but are not limited to, computers (stationary or portable), servers, storage systems, wireless access points, network switches, routers, docking stations, printers, or scanners. The electronic system 600 may be offered as a stand-alone product, a packaged solution, and can be utilized on a one-time full product/solution purchase or pay-per-use basis. The electronic system 600 may include one or more multi-chip modules, for example, a multi-chip module (MCM) 602 to process and/or store data. In some examples, the MCM 602 may include a processing resource 604 and a storage medium 606 mounted on a circuit board 608. Also, in some examples, the MCM 602 may host a photonic chip 610 on the circuit board 608. In some other examples, one or more of the processing resource 604, the storage medium 606, and the photonic chip 610 may be hosted on separate MCM (not shown). The circuit board 608 may be a printed circuit board (PCB) that includes several electrically conductive traces (not shown) to interconnect the processing resource 604, the storage medium 606, and the photonic chip 610 with each other and/or with other components disposed on or outside of the PCB.

The processing resource 604 may be a physical device, for example, one or more central processing units (CPUs), one or more semiconductor-based microprocessors, microcontrollers, one or more graphics processing unit (GPU), application-specific integrated circuit (ASIC), a field-programmable gate array (FPGA), other hardware devices, or combinations thereof, capable of retrieving and executing the instructions stored in the storage medium 606. The processing resource 604 may fetch, decode, and execute the instructions stored in the storage medium 606. As an alternative or in addition to executing the instructions, the processing resource 604 may include at least one integrated circuit (IC), control logic, electronic circuits, or combinations thereof that include a number of electronic components. The storage medium 606 may be any electronic, magnetic, optical, or any other physical storage device that contains or stores instructions that are readable and executable by the processing resource 604. Thus, the storage medium 606 may be, for example, Random Access Memory (RAM), non-volatile RAM (NVRAM), an Electrically Erasable Programmable Read-Only Memory (EEPROM), a storage device, an optical disc, and the like. In some embodiments, the storage medium 606 may be a non-transitory storage medium, where the term "non-transitory" does not encompass transitory propagating signals.

Further, in some examples, the photonic chip 610 may include a photonics controller 612 and one or more photonic devices such as the optical device 614. The optical device 614 may be an example representative of any of the optical devices 102, 202, 402, or 502. For illustration purposes, in FIG. 6, the photonic chip 610 is shown to include a single optical device 614. The use of a different number of optical devices or the use of several different types of optical devices in the photonic chip 610 is also envisioned within the scope of the present disclosure. For example, the photonic chip 610 may also include other photonic devices such as but not limited to, or optical converters, optical cables, waveguides, optical modulators (e.g., ring modulator), optical demodulators (e.g., ring demodulator), resonators, light sources (e.g., lasers), and the like. The photonic chip 610 may function as an optical receiver, optical transmitter, optical transceiver, optical communication and/or processing medium for the data and control signals (e.g., control voltages) received from the photonics controller 612. Non-limiting examples of the photonics controller 612 may be implemented using an IC chip such as, but not limited to, an ASIC, an FPGA chip, a processor chip (e.g., CPU and/or GPU), a microcontroller, or a special-purpose processor. During the operation of the electronic system 600, the photonics controller 612 may apply control voltages (e.g., the voltages V1 and V2 as described in FIG. 2) to control phase shifts applied to the optical signal passing through the optical device 614. In some examples, greater control of the phase shift helps achieve better modulation of optical signals resulting in effective data communication.

Figure 7:
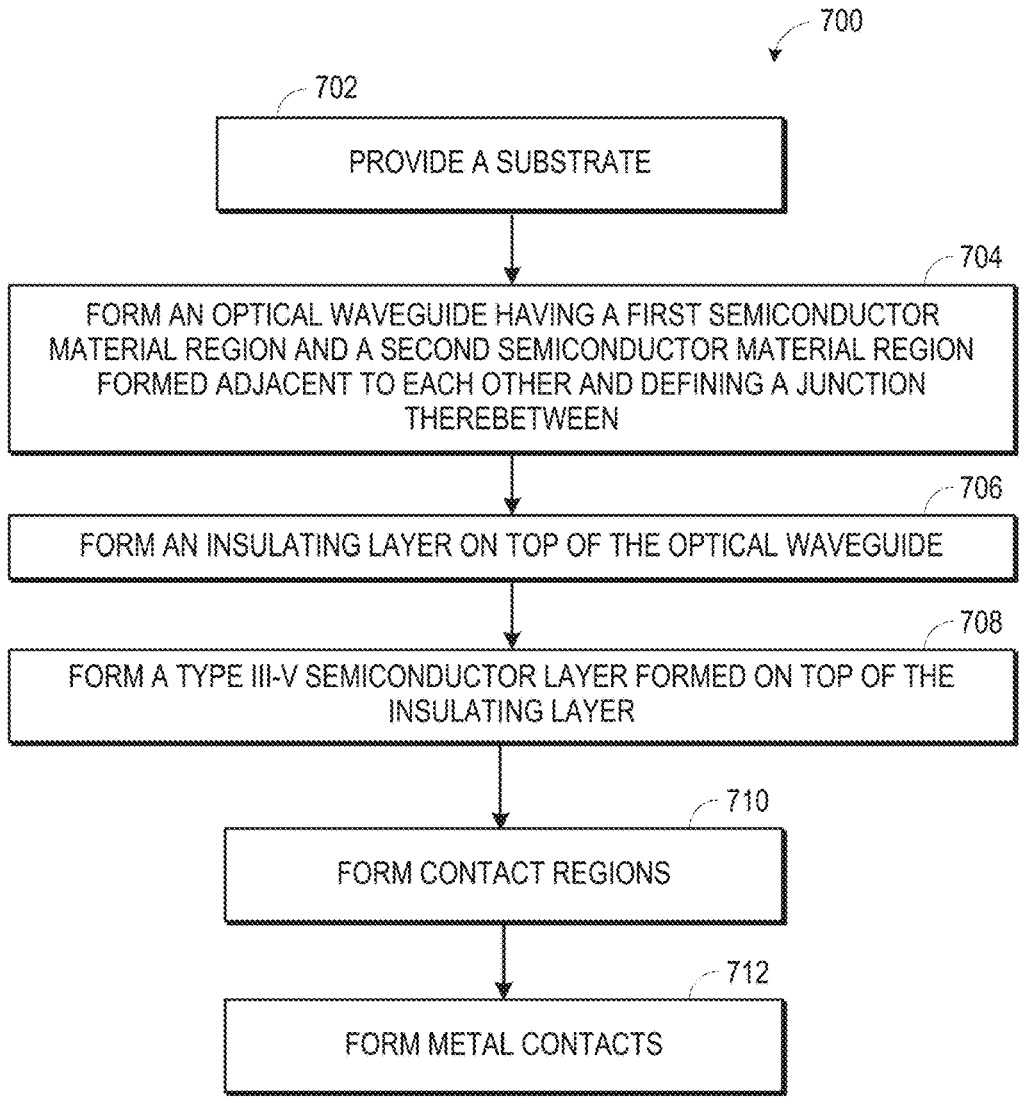
FIG. 7 depicts a flow diagram of an example method for fabricating an example optical device.

FIG. 7 depicts an example method 700 of forming an optical device such as the optical device 202 of FIG. 2. For illustration purposes the method 700 is described in conjunction with FIG. 2, however, the method steps described herein may also apply to other example optical devices described hereinabove.

At block 702, a substrate is provided. The substrate may be SOI substrate (e.g., the substrate 213) in one example. Further at block 704, an optical waveguide (e.g., the optical waveguide 204) comprising a first semiconductor material region (e.g., waveguide region 210) and a second semiconductor material region (e.g., waveguide region 212) formed adjacent to each other and defining a junction (e.g., the junction 214) therebetween. In some examples, the optical waveguide may be formed in a device layer (e.g., the device layer 217) of the SOI substrate by suitably shaping the device layer, for example, via techniques such as photolithography and etching. In particular, in one example, the first and second semiconductor material regions are formed such that at least a portion of the first semiconductor material region is formed over the second semiconductor material region. In some examples, the first and second semiconductor material regions are formed such that L-shaped or U-shaped junction is formed at the contact surfaces of the first and second semiconductor material regions.

In some examples, to form a PIN junction (for example, the PIN junction 514 depicted in FIG. 5), the device layer may be suitably shaped to form the optical waveguide (e.g., optical waveguide 504 and the contact regions (e.g., contact regions 508A and 508B). Once these regions are defined, an impurity doping is performed to cause respective dopings as depicted in FIG. 5, for example. In some examples, no impurity doping may be performed in the intrinsic semiconductor material region 509. This results in the formation of the PIN junction 514 via the waveguide regions 510, 512, and the intrinsic semiconductor material region 509.

Further, at block 706, an insulating layer (e.g., the insulating layer 216) may be formed on top of the optical waveguide. The insulating layer may be formed using thermal growth techniques and/or using deposition techniques, such as, chemical vapor deposition (CVD), for example. Furthermore, at block 708, a III-V semiconductor layer (e.g., the III-V semiconductor layer 218) may be formed on top of the insulating layer. The III-V semiconductor layer may be formed using epitaxial growth, deposition techniques (e.g., CVD), wafer bonding, transfer printing, or combinations thereof. In particular, techniques such as epitaxial growth and/or wafer bonding of the III-V semiconductor layer facilitate planar heterogeneous integration of other device structures such as lasers, modulators, and photon detectors all on a common substrate (e.g., the substrate 213). As previously described, the first semiconductor material region, the insulating layer, and the III-V semiconductor layer forms a waveguide integrated capacitor (e.g., the waveguide integrated capacitor 206). When an optical signal passes through the optical waveguide, the optical mode of the optical signal overlaps with all of the first semiconductor material region, the second semiconductor material region, the insulating layer, and the III-V semiconductor layer resulting in an efficient phase shifting of the optical signal.

Moreover, in some examples, at block 710, one or more contact regions (e.g., contact regions 208A, 208B, and 208C) may be formed. For example, the contact regions 208A, 208B, and 208C may be formed in contact with the first semiconductor material region, the second semiconductor material region, and the III-V semiconductor layer, respectively, as depicted in FIG. 2. The contact regions 208A-208C may be formed using techniques such as, but not limited to, thermal growth, CVD, wafer bonding, molecular beam epitaxy (MBE), and/or performing doping respective regions with suitable impurities. For example, the contact regions 208B and 208C are doped to include the second type (e.g., n-type) doping, and the contact region 208A is doped to include the first-type (e.g., p-type) doping. Further, in some examples, at block 712, metal contacts such as the metal contacts (e.g., metal contacts 220A, 220B, and 220C) are formed over the contact regions 208A, 208B, and 208C, respectively.

Figure 8:
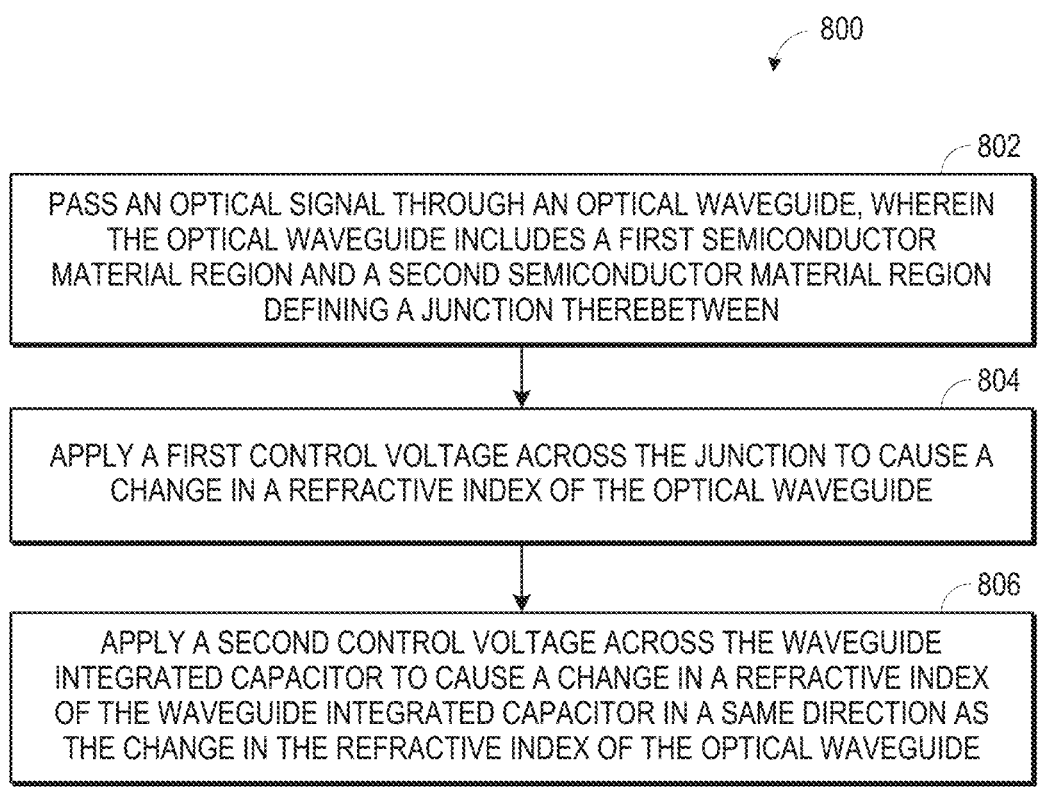
FIG. 8 depicts a flow diagram of an example method for operating an example optical device.

Turning now to FIG. 8, an example method 800 for operating an optical device such as the optical device 202 of FIG. 2 is presented. For illustration purposes the method 800 is described in conjunction with FIG. 2, however, the method steps described herein may also apply to other example optical devices described hereinabove.

At block 802, an optical signal may be passed through an optical waveguide 204 of the optical device 202, for example. Due to the heterogeneous integration of the III-V semiconductor layer 218 on the optical waveguide 204 via the thin insulating layer 216, the optical mode 207 of the optical signal overlaps with the waveguide regions 210, 212, the insulating layer 216, and the III-V semiconductor layer 218. Further, at block 804, a first control voltage is applied across a junction in the optical waveguide 204. For example, as depicted in FIG. 2, the first reverse bias voltage V1 may be applied across the PN junction 214 to cause a change (e.g., increase in case of optical device 202) in a refractive index of the optical waveguide 204 as described earlier in conjunction with FIG. 2. Furthermore, in some examples, at block 806, a second control voltage is applied across the waveguide integrated capacitor 206 to cause a change in the refractive index of the waveguide integrated capacitor 206. In particular, the second control voltage is set such that the change in the refractive index of the waveguide integrated capacitor 206 is in the same direction as the change in the refractive index of the optical waveguide 204 so that an overall larger change in the refractive index is achieved. For example, in the optical device 202 of FIG. 2, the second control voltage is also a reverse bias voltage so that the waveguide integrated capacitor 206 operates in the charge carrier dissipation mode causing the refractive index of the waveguide integrated capacitor 206 to increase. In this manner, by simultaneously operating both the PN junction 214 and the waveguide integrated capacitor 206 with reverse bias voltages large change in the refractive index is achieved resulting in enhanced phase-shifting efficiency of the optical device 202.

In another example implementation (e.g., the optical device 502 of FIG. 5) with the optical waveguide having the PIN junction 514, a first control voltage (i.e., the voltage applied across the PIN junction 514) and the second control voltage (i.e., the voltage applied across the waveguide integrated capacitor 506) are forward bias voltages. Application of such forward bias voltages to the optical device 502 of FIG. 5 results in a simultaneous decrease in the refractive index of the optical waveguide and the refractive index of the waveguide integrated capacitor. Accordingly, the refractive indexes of the PIN junction 514 and the waveguide integrated capacitor 506 can be decreased together resulting in enhanced phase-shifting efficiency of the optical device 502.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled to" as used herein, is defined as connected, whether directly without any intervening elements or indirectly with at least one intervening element, unless indicated otherwise. For example, two elements may be coupled to each other mechanically, electrically, optically, or communicatively linked through a communication channel, pathway, network, or system. Further, the term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

While certain implementations have been shown and described above, various changes in form and details may be made. For example, some features and/or functions that have been described in relation to one implementation and/or process may be related to other implementations. In other words, processes, features, components, and/or properties described in relation to one implementation may be useful in other implementations. Furthermore, it should be appreciated that the systems and methods described herein may include various combinations and/or sub-combinations of the components and/or features of the different implementations described. Moreover, method blocks described in various methods may be performed in series, parallel, or a combination thereof. Further, the method blocks may as well be performed in a different order than depicted in flow diagrams.

Further, in the foregoing description, numerous details are set forth to provide an understanding of the subject matter disclosed herein. However, an implementation may be practiced without some or all of these details. Other implementations may include modifications, combinations, and variations from the details discussed above. It is intended that the following claims cover such modifications and variations.

What is claimed is:

1. An optical device comprising:
   an optical waveguide comprising a first semiconductor material region and a second semiconductor material region defining a junction therebetween, wherein the junction is a PN junction formed at boundaries of the first semiconductor material region and the second semiconductor material region that contact each other;
   an insulating layer formed on top of the optical waveguide; and
   a III-V semiconductor layer formed on top of the insulating layer causing an optical mode of an optical signal passing through the optical waveguide to overlap with the first semiconductor material region, the second semiconductor material region, the insulating layer, and the III-V semiconductor layer thereby resulting in a phase shift in the optical signal passing through the optical waveguide.

2. The optical device of claim 1, wherein the junction between the first semiconductor material region and the second semiconductor material region is L-shaped, and wherein at least a portion of the first semiconductor material region is formed over the second semiconductor material region, and wherein the insulating layer is formed on top of the first semiconductor material region.

3. The optical device of claim 1, wherein the junction between the first semiconductor material region and the second semiconductor material region is inverted U-shaped, wherein the first semiconductor material region is formed over the second semiconductor material region, and wherein the insulating layer is formed on top of the first semiconductor material region.

4. The optical device of claim 1, wherein the optical device is disposed in an optical transceiver.

5. The optical device of claim 4, wherein the optical transceiver is disposed in one or more of a server, a storage device, a router, a network switch, or an access point.

6. The optical device of claim 1, wherein the first semiconductor material region comprises p-type doping, and the second semiconductor material region and the III-V semiconductor layer comprise n-type doping.

7. The optical device of claim 6, and wherein the PN junction operated in a charge carrier depletion mode by applying a first control voltage across the first semiconductor material region and the second semiconductor material region resulting in a depletion of charge carriers from a depletion region near the PN junction.

8. The optical device of claim 1, wherein the first semiconductor material region, the insulating layer, and the III-V semiconductor layer form a waveguide integrated capacitor that is integrated with the optical waveguide, wherein the waveguide integrated capacitor is operated in a charge carrier dissipation mode by applying a second control voltage resulting in dissipation of holes in the first semiconductor material region near the insulating layer and dissipation of electrons in the III-V semiconductor layer near the insulating layer.

9. The optical device of claim 8, wherein operation of the PN junction in a charge carrier depletion mode and the waveguide integrated capacitor in the charge carrier dissipation mode causes an increase in an effective refractive index of the optical waveguide up to about 43.8% leading to an enhanced phase-shifting efficiency.

10. The optical device of claim 7, wherein a wavelength of the optical signal passing through the optical waveguide is in a range from 1100 nanometers (nm) to 2000 nm.

11. The optical device of claim 1, wherein the optical waveguide further comprises an intrinsic semiconductor material region sandwiched between the first semiconductor material region and the second semiconductor material region, and wherein the optical mode overlaps with the intrinsic semiconductor material region.

12. An electronic system, comprising:
a processing resource;
a storage medium communicatively coupled to the processing resource; and
a photonic chip communicatively coupled to the processing resource and comprising an optical device, wherein the optical device comprises:
an optical waveguide comprising a first semiconductor material region and a second semiconductor material region formed adjacent to each other and defining a junction therebetween, wherein the junction is a PN junction formed at boundaries of the first semiconductor material region and the second semiconductor material region that contact each other;
an insulating layer formed on top of the optical waveguide; and
a III-V semiconductor layer formed on top of the insulating layer causing an optical mode of an optical signal passing through the optical waveguide to overlap with the first semiconductor material region, the second semiconductor material region, the insulating layer, and the III-V semiconductor layer thereby resulting in a phase shift in the optical signal passing through the optical waveguide.

13. The electronic system of claim 12, wherein the junction between the first semiconductor material region and the second semiconductor material region is L-shaped, and wherein at least a portion of the first semiconductor material region is formed over the second semiconductor material region, and wherein the insulating layer is formed on top of the first semiconductor material region.

14. The electronic system of claim 12, wherein the junction between the first semiconductor material region and the second semiconductor material region is inverted U-shaped, and wherein the first semiconductor material region is formed over the second semiconductor material region, and wherein the insulating layer is formed on top of the first semiconductor material region.

15. The electronic system of claim 12, wherein the first semiconductor material region comprises n-type doping, and the second semiconductor material region and the III-V semiconductor layer comprise p-type doping.

16. The electronic system of claim 12, wherein the optical waveguide further comprises an intrinsic semiconductor material region sandwiched between the first semiconductor material region and the second semiconductor material region, and wherein the optical mode also overlaps with the intrinsic semiconductor material region.

17. The electronic system of claim 12, wherein one or more of the processing resource, the storage medium, and the photonic chip are mounted on a circuit board forming a multi-chip module.

18. A method for operating an optical device comprising:
passing an optical signal through an optical waveguide of the optical device, wherein the optical waveguide comprises a first semiconductor material region and a second semiconductor material region defining a junction therebetween, an insulating layer formed on top of the optical waveguide, and a III-V semiconductor layer formed on top of an insulating layer, wherein the first semiconductor material region, the insulating layer, and the III-V semiconductor layer forms a waveguide integrated capacitor, and wherein an optical mode of an optical signal the optical waveguide to overlap with the first semiconductor material region, the second semiconductor material region, the insulating layer, and the III-V semiconductor layer, wherein the junction is a PN junction formed at boundaries of the first semiconductor material region and the second semiconductor material region that contact each other;
applying a first control voltage across the junction to cause a change in a refractive index of the optical waveguide; and
applying a second control voltage across the waveguide integrated capacitor to cause a change in a refractive index of the waveguide integrated capacitor in a same direction as the change in the refractive index of the optical waveguide.

19. The method of claim 18, and wherein the first control voltage and the second control voltage are reverse bias voltages resulting in a simultaneous increase in the refractive index of the optical waveguide and the refractive index of the waveguide integrated capacitor.

20. The method of claim 18, wherein the junction is a PIN junction, and wherein the first control voltage and the second control voltage are forward bias voltages resulting in a simultaneous decrease in the refractive index of the optical waveguide and the refractive index of the waveguide integrated capacitor.

* * * * *